US007013455B1

(12) United States Patent
Ku et al.

(10) Patent No.: US 7,013,455 B1
(45) Date of Patent: Mar. 14, 2006

(54) SYSTEM FOR AUTOMATICALLY ALTERING ENVIRONMENT VARIABLE TO RUN PROPER EXECUTABLE FILE BY REMOVING REFERENCES TO ALL EXCEPT ONE DUPLICATE FILE IN THE PATH SEQUENCE

(75) Inventors: William Hsiao-Yu Ku, Austin, TX (US); Joey Allen Perry, Pflugerville, TX (US); John Shih-Yuan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/690,457

(22) Filed: Oct. 19, 2000

(51) Int. Cl.
*G06F 9/44* (2006.01)

(52) U.S. Cl. ...................... 717/127; 717/168; 717/169; 717/174; 717/175

(58) Field of Classification Search ................ 718/100, 718/101, 106; 709/200; 717/121, 176, 174, 717/175, 127, 168, 169; 714/38; 713/2
See application file for complete search history.

(56) References Cited

U.S. PATENT DOCUMENTS

| 5,301,323 | A |   | 4/1994  | Maeurer et al. ............ 395/650 |
| 5,557,790 | A |   | 9/1996  | Bingham et al. ........... 395/600 |
| 5,634,098 | A | * | 5/1997  | Janniro et al. ................ 714/38 |
| 5,680,611 | A |   | 10/1997 | Rail et al. .................... 395/612 |
| 5,732,265 | A |   | 3/1998  | Dewitt et al. ................ 395/616 |
| 5,758,154 | A | * | 5/1998  | Qureshi .......................... 713/1 |
| 5,799,302 | A |   | 8/1998  | Johnson et al. ................ 707/7 |
| 5,909,581 | A | * | 6/1999  | Park ............................ 717/170 |
| 5,956,513 | A | * | 9/1999  | McLain, Jr. ................ 717/142 |
| 5,960,202 | A | * | 9/1999  | Granston et al. ........... 717/141 |
| 5,966,540 | A | * | 10/1999 | Lister et al. ................ 717/174 |
| 5,966,702 | A |   | 10/1999 | Fresko et al. ................... 707/1 |
| 5,974,470 | A | * | 10/1999 | Hammond .................... 719/331 |
| 6,115,741 | A | * | 9/2000  | Domenikos et al. ........ 709/217 |
| 6,192,517 | B1 | * | 2/2001 | Agesen et al. ............. 717/154 |
| 6,202,070 | B1 | * | 3/2001 | Nguyen et al. .......... 707/104.1 |
| 6,256,642 | B1 | * | 7/2001 | Krueger et al. ............. 707/205 |
| 6,263,377 | B1 | * | 7/2001 | Monday et al. ............. 719/320 |
| 6,279,109 | B1 | * | 8/2001 | Brundridge .................... 713/2 |
| 6,389,427 | B1 | * | 5/2002 | Faulkner .................. 707/104.1 |
| 6,389,433 | B1 | * | 5/2002 | Bolosky et al. ............. 707/205 |
| 6,418,555 | B1 | * | 7/2002 | Mohammed ................ 717/169 |
| 6,564,369 | B1 | * | 5/2003 | Hove et al. ................. 717/121 |
| 6,571,389 | B1 | * | 5/2003 | Spyker et al. .............. 717/176 |
| 6,629,113 | B1 | * | 9/2003 | Lawrence ................... 707/206 |
| 6,629,316 | B1 | * | 9/2003 | Curtis ........................ 717/174 |

(Continued)

*Primary Examiner*—Thomas Lee
*Assistant Examiner*—Lilian Vo
(74) *Attorney, Agent, or Firm*—Duke W. Yee; Marilyn Smith Dawkins; Wayne P. Bailey

(57) ABSTRACT

A method, system, and apparatus for correcting a path sequence of an environment variable in a data processing system is provided. In one embodiment, an environment variable manager monitors the data processing system for any change effecting any of the environment variables within the data processing system. If a change effecting the environment variable is detected, the environment variable manager modifies the environment variable to ensure that a proper file is found and used when the file is selected by a user or a running application program. Therefore, when duplicate files exist on the data processing system, the environment variable manager ensures that the incorrect file is not used when the file is requested by a user or a running application program.

6 Claims, 2 Drawing Sheets

U.S. PATENT DOCUMENTS

| | | | |
|---|---|---|---|
| 6,631,521 B1 * | 10/2003 | Curtis | 717/175 |
| 6,634,022 B1 * | 10/2003 | Leermakers | 717/158 |
| 6,640,317 B1 * | 10/2003 | Snow | 714/38 |
| 6,694,511 B1 * | 2/2004 | Yokote | 717/148 |
| 6,836,888 B1 * | 12/2004 | Basu et al. | 718/104 |
| 2001/0014968 A1 * | 8/2001 | Mohammed | 717/11 |
| 2002/0010808 A1 * | 1/2002 | Wiggins et al. | 709/328 |
| 2002/0129043 A1 * | 9/2002 | Nakada et al. | 707/200 |
| 2002/0144248 A1 * | 10/2002 | Forbes et al. | 717/167 |
| 2003/0159135 A1 * | 8/2003 | Hiller et al. | 717/166 |
| 2004/0034686 A1 * | 2/2004 | Guthrie | 709/203 |
| 2005/0086641 A1 * | 4/2005 | Hussey | 717/121 |

* cited by examiner

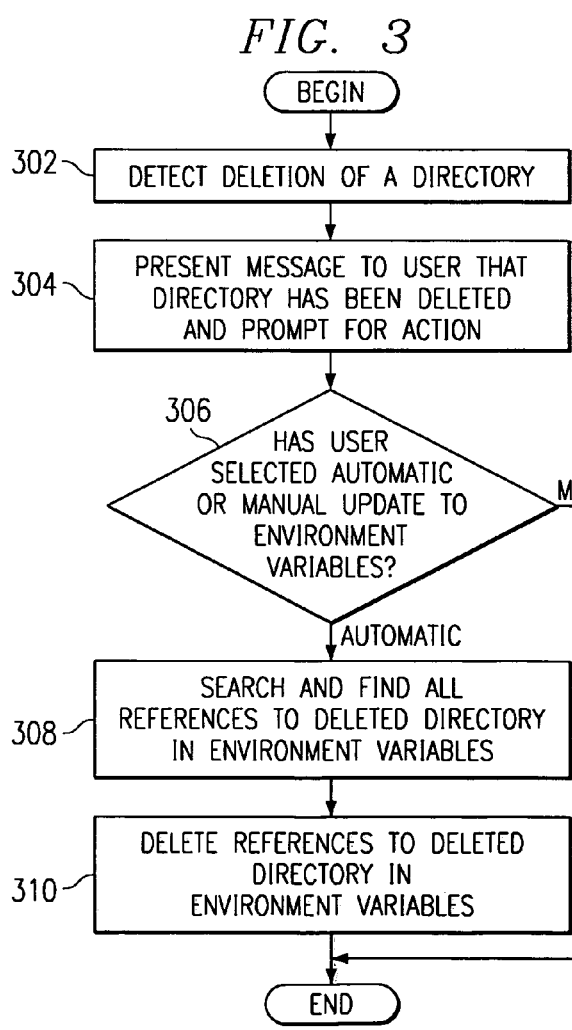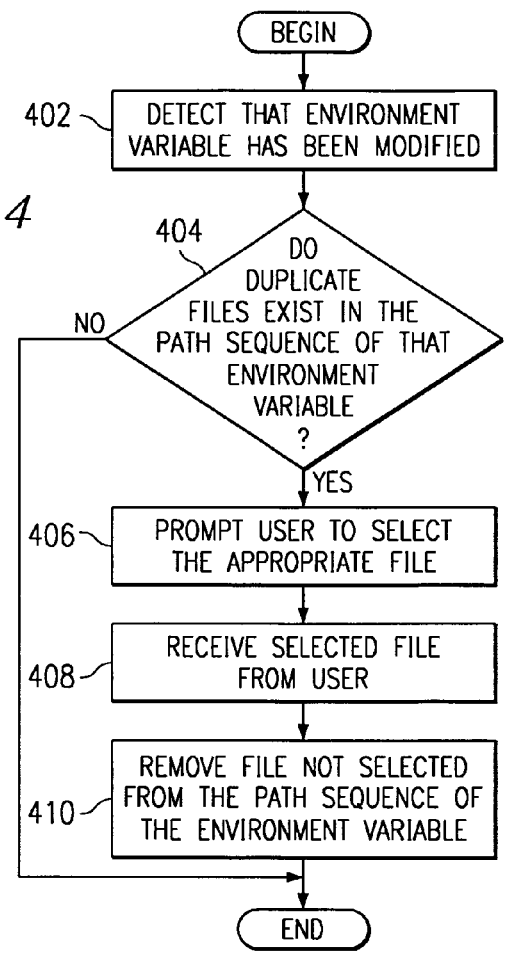

SYSTEM FOR AUTOMATICALLY ALTERING ENVIRONMENT VARIABLE TO RUN PROPER EXECUTABLE FILE BY REMOVING REFERENCES TO ALL EXCEPT ONE DUPLICATE FILE IN THE PATH SEQUENCE

BACKGROUND OF THE INVENTION

1. Technical Field

The present invention relates generally to the field of computer software and, more particularly, to monitoring changes to environment variables.

2. Description of Related Art

Computer use has increased exponentially during the past several years. Much of this growth has been due to the increasing use of personal computers for home use due to recent sharp decreases in the price of computers as technology advances. This increase in the number of computers in use has also been spurred by the recent explosion of the Internet.

Thus large numbers of people with little or no computer expertise are interacting with computers on a daily basis. Novice users are purchasing and loading software applications onto their computers from a variety of sources without regard for what other software applications may exist on their computer and without regard as to how the different software applications will integrate with each other. Many of these software applications include and use some of the same executable files as other software applications already loaded onto the user's computer. When a new software application is loaded, the user may end up having multiple copies of the same executable file stored in different locations in the user's computer. However, the two copies of the executable file may be different versions.

Thus, if one software application attempts to run the wrong version of the executable file, problems may occur. The problem of duplicate files is not limited to situations arising from inexperienced computer users as discussed above. Duplicate files also may pose a problem to even more sophisticated computer users. For example, a user may, for various reasons, expressly desire to have multiple versions of a software application or data file available on the computer. However, ensuring that the proper file is selected is still a problem.

One reason some software errors occur due to the existence of duplicate files is that the incorrect one is often selected due to the order of the directories in an environment variable. For example, assume that the PATH environment variable is defined as "PATH=C:\x\bin;C:\y\bin" and a.exe exists in both C:\x\bin and C:\y\bin. When the user executes a.exe, the one in the C:\x\bin directory will be used. In some cases, this is exactly what the users desires. However, in other cases, the user wishes to execute C:\y\bin\a.exe, but the user is unaware that a.exe also exists in C:\x\bin.

Thus, duplicate files can cause numerous problems and often these problems are very difficult to debug. Therefore, it would be desirable to have a method, system, and apparatus for managing the path sequence of environment variables to prevent the existence of duplicate path sequences in an environment variable.

SUMMARY OF THE INVENTION

The present invention provides a method, system, and program for automatically invoking an environment variable manager whenever a path sequence for an environment variable may be modified. The environment variable manager then corrects the path sequence of the environment variable in a data processing system. In one embodiment, an environment variable manager monitors the data processing system for any change effecting any of the environment variables within the data processing system. If a change effecting the environment variable is detected, the environment variable manager modifies the environment variable to ensure that a proper file is found and used when the file is selected by a user or requested by a running application program. Therefore, when duplicate files exist on the data processing system, the environment variable manager ensures that the incorrect file is not used when the file is requested by a user or requested by a running application program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a process flow and program function for updating the path sequence of an environment variable when a directory is manually deleted in accordance with the present invention; and FIG. 4 depicts a process flow and program function for removing duplicate file names from a path sequence of an environment variable in accordance with the present invention.

DETAILED DESCRIPTION OF THE PREFERRED EMBODIMENT

Figure 1:
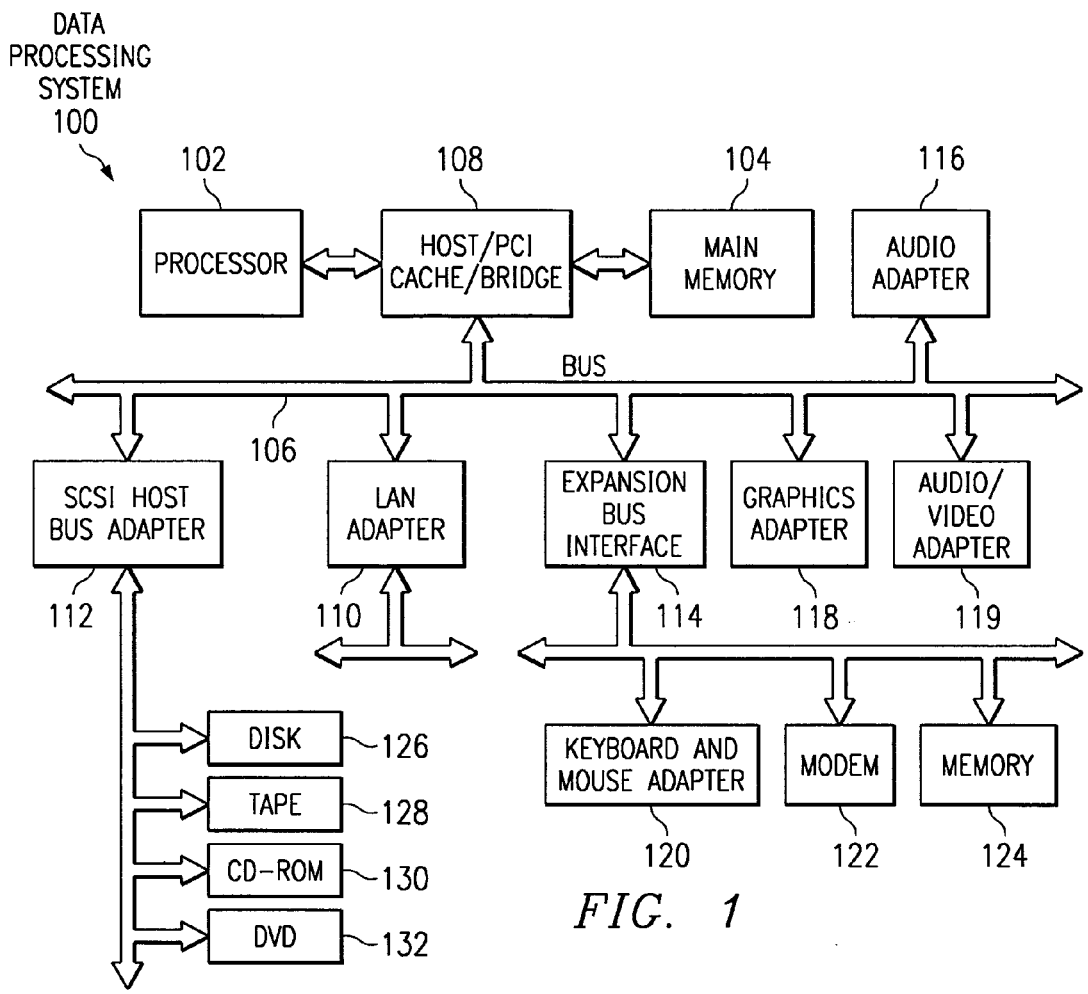
FIG. 1 depicts a block diagram of a data processing system in which the present invention may be implemented.

With reference now to the figures, and in particular with reference to FIG. 1, a block diagram of a data processing system in which the present invention may be implemented is illustrated. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-in boards.

In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. In the depicted example, SCSI host bus adapter 112 provides a connection for hard disk drive 126, tape drive 128, CD-ROM drive 130, and digital video disc read only memory drive (DVD-ROM)

132. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 100. Instructions for the operating system, the object-oriented operating system, and applications or programs are located on a storage device, such as hard disk drive 126, and may be loaded into main memory 104 for execution by processor 102.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

Figure 2:
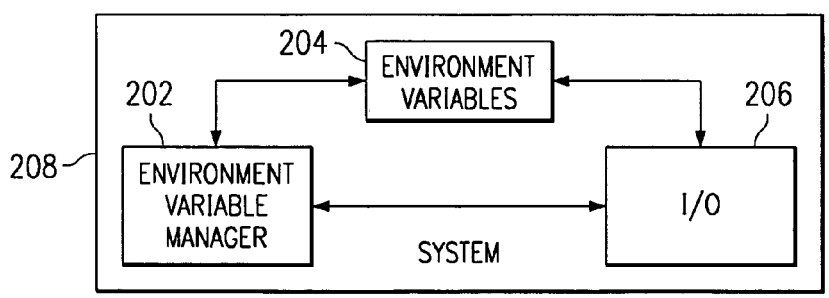
FIG. 2 depicts a block diagram illustrating a path management system in accordance with the present invention.

With reference now to FIG. 2, a block diagram illustrating a path management system is depicted in accordance with the present invention. System 208 may be implemented as, for example, data processing system 100 in FIG. 1. Duplicate files on the same system 208 will cause problems when both files are in an environment variable's 204 path sequence. An environment variable is an item of data that is updated by the operating system, Web server or other control program. Environment variables typically reside in memory, such as, for example, memory 124 in FIG. 1, and can be read by applications to determine the current status of the system 208. Environment variables contain data such as time, date, path sequence, version number, login information and so on. One example of an environment variable is the PATH environment variable. Other examples of environment variables, as will be recognized by one of ordinary skill in the art, include CLASS PATH, LOC PATH, and LIB PATH.

When a path sequence is modified or when duplicate files are created or installed in the system 208, environment variable manager 202 informs a user of this modification through I/O device interface 206. I/O device interface 206 may comprise a plurality of interfaces and/or devices and provides an interface to numerous devices such as, for example, a keyboard and/or mouse for receiving user input and, for example, a video display terminal for displaying information to a user. Environment variable manager 208 then prompts the user, through I/O device interface 206 for actions to be taken to correct the problem.

When a directory is manually deleted from system 208, some path sequences of environment variables 204 which contain that directory may not be affected, but the non-existent directory may cause confusion at a later time. Therefore, environment variable manager 202 informs the user at that moment so that the non-existent directory may be deleted from the path sequence of the affected environment variables 204.

With reference now to FIG. 3, a process flow and program function for updating the path sequence of an environment variable when a directory is manually deleted is depicted in accordance with the present invention. Once an environment variable manager, such as, for example, environment variable manager 202 in FIG. 2, detects the deletion of a directory (step 302) from the system, such as, for example, system 208 in FIG. 2, the environment variable manager presents a message to the user that a directory has been deleted and prompts the user for an appropriate action (step 304). The user may select to allow the environment variable manager to automatically update the affected environment variables, such as, for example, environment variables 204 in FIG. 2, or may, alternatively, choose to modify the affected environment variables manually.

Thus, the environment variable manager determines from the user input whether the user has selected an automatic or manual update to the environment variables (step 306). If the user selects an automatic update, the environment variable manager searches and finds all references to the deleted directory in the environment variables (step 308). Once the affected environment variables have been found, the environment variable manager deletes all references to the deleted directory from the affected environment variables (step 310). If the user selects a manual update, the environment variable manager searches and finds all references to the deleted directory in environment variables (step 312) and presents the list of all affected environment variables to the user (step 314). The user may then manually edit each affected environment variable to correct the problem.

Returning now to FIG. 2, when a software product is installed on system 208, additional directories may be added to the path sequence of some environment variables 204. This could result in duplicate files existing in system 208 and environment variable manager 202 informs the user, through I/O device interface 206 such that the problem may be corrected. Furthermore, when an environment variable 204 is modified manually or by the system, this also could result in duplicate files existing in the path sequence of that particular environment variable 204. Since the first path found in the environment variable 204 will be the one selected, problems may arise if the undesired one is selected first. Therefore, environment variable manager 202 monitors and detects modification of environment variables 204 and determines whether duplicate path sequences exist. If duplicate files exist in the path sequence of one or more of environment variables 204, environment variable manager 202 prompts the user via I/O device interface 206 for the appropriate action and then corrects the problem.

With reference now to FIG. 4, a process flow and program function for removing duplicate file names from a path sequence of an environment variable is depicted in accordance with the present invention. The environment variable manager, such as, for example, environment variable manager 202 in FIG. 2, monitors environment variables, such as, for example environment variables 204 in FIG. 2. If the environment variable manager detects that an environment variable has been modified (step 402), environment variable manager determines whether duplicate files exist in the path sequence of that environment variable (step 404). If no duplicate files exist in the path sequence of the modified environment variable, then no further action is taken.

If, however, duplicate files do exist in the path sequence of the modified environment variable, the environment variable manager prompts the user to select the appropriate file name that is the correct file (step 406). Once the environment variable manager receives the selection of the correct file from the user (step 408), the environment variable manager then removes the incorrect file or files from the path sequence of the modified environment variable (step 410). Thus, the path sequence of the environment variable is corrected to ensure that the proper file is used when necessary.

It is important to note that while the present invention has been described in the context of a fully functioning data processing system, those of ordinary skill in the art will appreciate that the processes and program function of the present invention are capable of being distributed in the form of a computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for correcting a path sequence of an environment variable in a data processing system, the path sequence specifying an order for searching a plurality of different directories for locating executable code within the data processing system, the method comprising:
    monitoring the data processing system for a change effecting the path sequence of the environment variable, wherein the environment variable is enabled and being used by the data processing system to specify the order for searching the plurality of different directories within the data processing system;
    responsive to detection of the change effecting the path sequence of the environment variable, determining whether any duplicate files exist in any of the directories identified by the path sequence;
    responsive to determining that duplicate files do exist, automatically altering the path sequence of the environment variable to ensure that a proper executable file is found and executed when selected by one of a user and a running application program, wherein the step of altering the path sequence of the environment variable comprises removing references to all but one of duplicate files in the path sequence of the environment variable; and
    after altering the path sequence, using the altered path sequence to find and execute the proper executable file.

2. The computer implemented method as recited in claim 1, wherein the all but one duplicate file is selected by a user.

3. A computer program product tangibly-embodied in a tangible computer readable media for use in a data processing system for correcting a path sequence of an environment variable in a data processing system, the path sequence specifying an order for searching a plurality of different directories for locating executable code within the data processing system, the computer program product comprising:
    first instructions for monitoring the data processing system for a change effecting the path sequence of the environment variable, wherein the environment variable is enabled and being used by the data processing system to specify the order for searching the plurality of different directories within the data processing system;
    second instructions, responsive to detection of the change effecting the path sequence of the environment variable, for determining whether any duplicate files exist in any of the directories identified by the path sequence;
    third instructions, responsive to determining that duplicate files do exist, for automatically altering the path sequence of the environment variable to ensure that a proper executable file is found and executed when selected by one of a user and a running application program, wherein the instructions for altering the path sequence of the environment variable comprises removing references to all but one of duplicate files in the path sequence of the environment variable; and
    fourth instructions, responsive to altering the path sequence, for using the altered path sequence to find and execute the proper executable file.

4. The computer program product as recited in claim 3, wherein the all but one duplicate file is selected by a user.

5. A system for correcting a path sequence of an environment variable in a hardware data processing system, the path sequence specifying an order for searching a plurality of different directories for locating executable code within the data processing system, the system comprising:
    first means for monitoring the hardware data processing system for a change effecting the path sequence of the environment variable, wherein the environment variable is enabled and being used by the hardware data processing system to specify the order for searching the plurality of different directories within the hardware data processing system;
    second means, responsive to detection of the change effecting the path sequence of the environment variable, for determining whether any duplicate files exist in any of the directories identified by the path sequence;
    third means, responsive to determining that duplicate files do exist, for automatically altering the path sequence of the environment variable to ensure that a proper executable file is found and executed when selected by one of a user and a running application program, wherein the means for altering the path sequence of the environment variable comprises removing references to all but one of duplicate files in the path sequence of the environment variable; and
    fourth means, responsive to altering the path sequence, for using the altered path sequence to find and execute the proper executable file.

6. The system as recited in claim 5, wherein the all but one duplicate file is selected by a user.

* * * * *